Jan. 18, 1966   E. LE ROY BISCHOFF ET AL   3,230,531
BROADBAND STREAMLINED RADAR REFLECTOR
Filed Nov. 24, 1961   4 Sheets-Sheet 1

INVENTORS:
MALCOLM YAFFE
JOSEPH P. SPAMPINATO
ELTON L. BISCHOFF
BY Henry William Kaufmann
AGENT Jan. 18, 1966   E. LE ROY BISCHOFF ET AL   3,230,531
BROADBAND STREAMLINED RADAR REFLECTOR
Filed Nov. 24, 1961   4 Sheets-Sheet 3
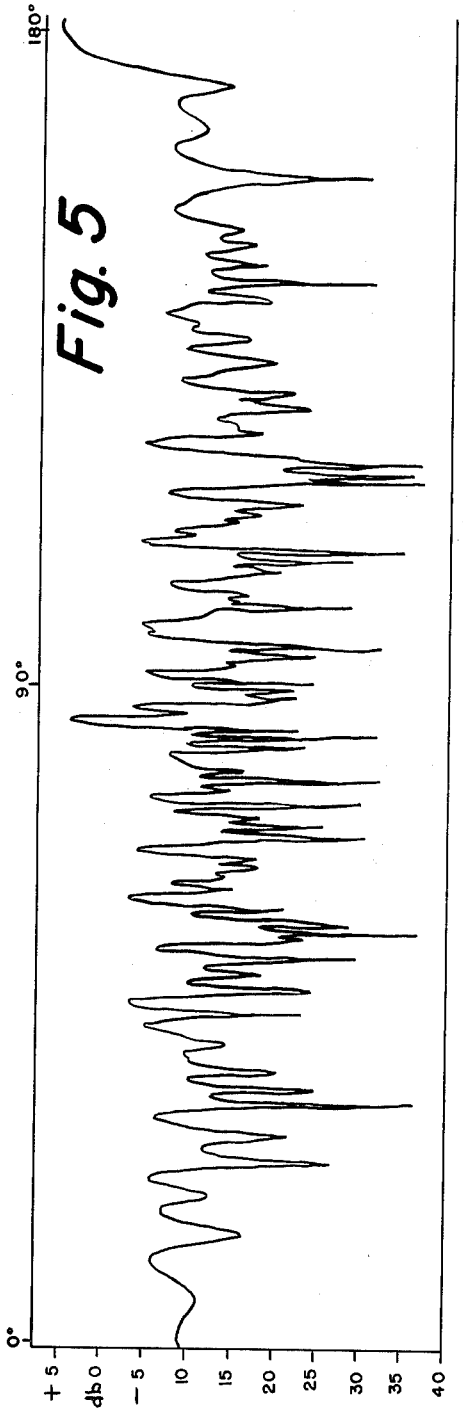
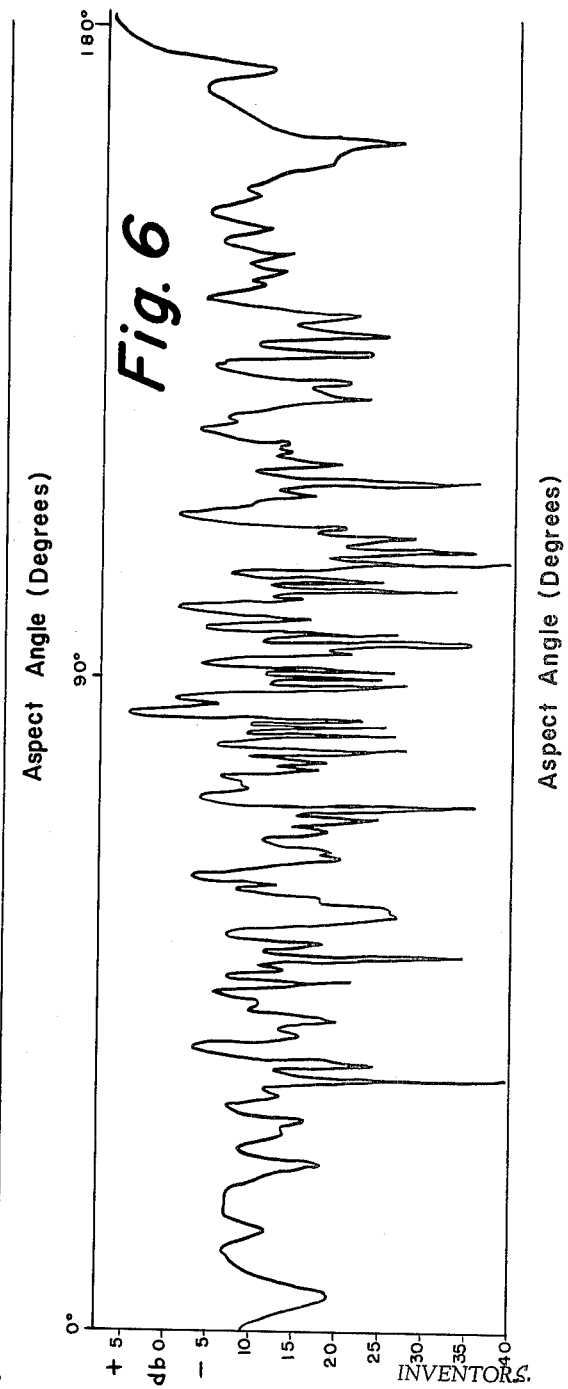
INVENTORS.
MALCOLM YAFFE
JOSEPH P. SPAMPINATO
ELTON L. BISCHOFF
BY Henry William Kaufmann
AGENT .8  .4  .2
Square Meters .8  .4  .2
Square Meters United States Patent Office 3,230,531
Patented Jan. 18, 1966

3,230,531
BROADBAND STREAMLINED RADAR
REFLECTOR
Elton Le Roy Bischoff, Wayne, Joseph Peter Spampinato, Springfield, and Malcolm Yaffe, Elkins Park, Pa., assignors to General Electric Company, a corporation of New York
Filed Nov. 24, 1961, Ser. No. 154,588
2 Claims. (Cl. 343—18)

This invention pertains to reflectors to reflect electromagnetic radiation, particularly reflectors adapted to be readily observed by radar equipment.

One of the earliest and best known reflectors used to provide a readily detectable radar target is the corner reflector, which consists of three mutually orthogonal reflecting surfaces. It can be shown that a reflectible beam entering into a corner reflector at any angle will be so reflected as to return in the direction from which it came. This is the basic effect desired from any radar reflector; generally, randomly shaped objects tend to scatter or reflect radiation in directions other than that from which it arrived, with consequent loss of much of the energy originally incident. So far as theory is concerned, the corner reflector leaves nothing to be desired; and many thousands have been used for miscellaneous purposes, most notably, perhaps, the large quantities which were included with inflatable lifeboat kits during wars. It is also currently customary on sailing vessels in the steamer lanes to hoist a corner reflector to facilitate detection by radar-equipped steamships. However, the corner reflector, although light in weight and cheap, is mechanically inconvenient in that it is somewhat sensitive to relatively small angular misalignments and must be held in shape by projecting rigid members. Aerodynamically, a corner reflector is somewhat of a monstrosity, bearing much more resemblance to a sea anchor than to any shape more streamlined. There are many purposes for which it would be desirable to have radar reflectors without weak, contour-deforming projections. For navigational purposes, reflectors mounted upon marine buoys or upon masts are exposed to sea and weather; compact reflectors not readily damaged would be convenient for such application. Similarly, radar reflectors projected like rockets, or dropped from planes, are useful for signalling purposes; but to use a corner reflector conveniently thus would require self-erection systems for putting the reflector into its proper configuration after release. For training radar operators in detecting mortar shells and other missiles, it is desirable to have available devices which can be physically smaller than the missile to be simulated, and thus permit, "subcaliber" practice. In short, there are many uses for strong, compact radar reflectors.

Conventionally shaped conductive solids, such as cylinders, or tapered shapes such as conventional artillery shells, while meeting the general mechanical requirements, are disappointing reflectors, because they tend to scatter energy forward instead of directing it backward to the source. Our invention teaches a way of designing shapes of this general kind to function as highly effective reflectors simulating the reflections of homogeneous objects many times larger. This we do by breaking the conductive path over the surface of such an object, replacing the conductor at the breaks with insulating or dielectric magnetic material, and causing each isolated conductive portion to scatter radiation like a separate element in an array. Since it is frequently desirable that the reflectivity of such a device be not extremely frequency sensitive, we include in our teaching means for achieving broad-band characteristics in reflectors according to our invention.

Thus an important objective of our invention is to teach the design of radar reflectors whose characteristics of high back reflectivity (sometimes described as large radar cross-section or area), freedom from protrusions, potentially good mechanical strength, and potentialities of good aerodynamic shape render them of use for a large number of varied applications, where some or all of these characteristics are beneficial.

For the better understanding of our invention we have provided figures of drawing in which.

Figure 1:
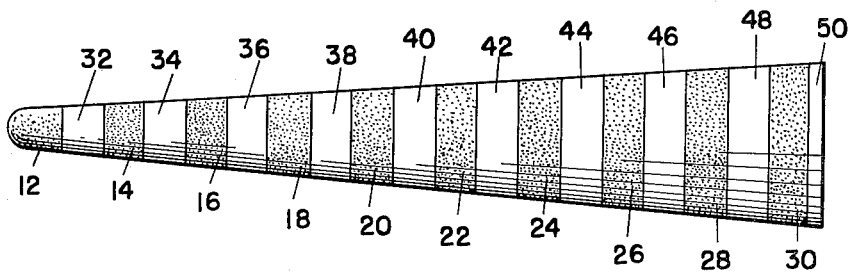
FIG. 1 represents in elevation an extremely simple shape of reflector embodying our invention.
Figure 2:
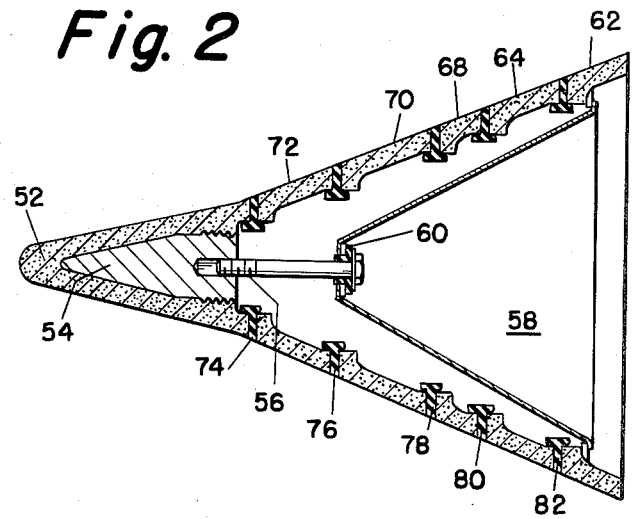
FIG. 2 represents in section a somewhat more complex shape of reflector embodying our invention.
Figure 3:
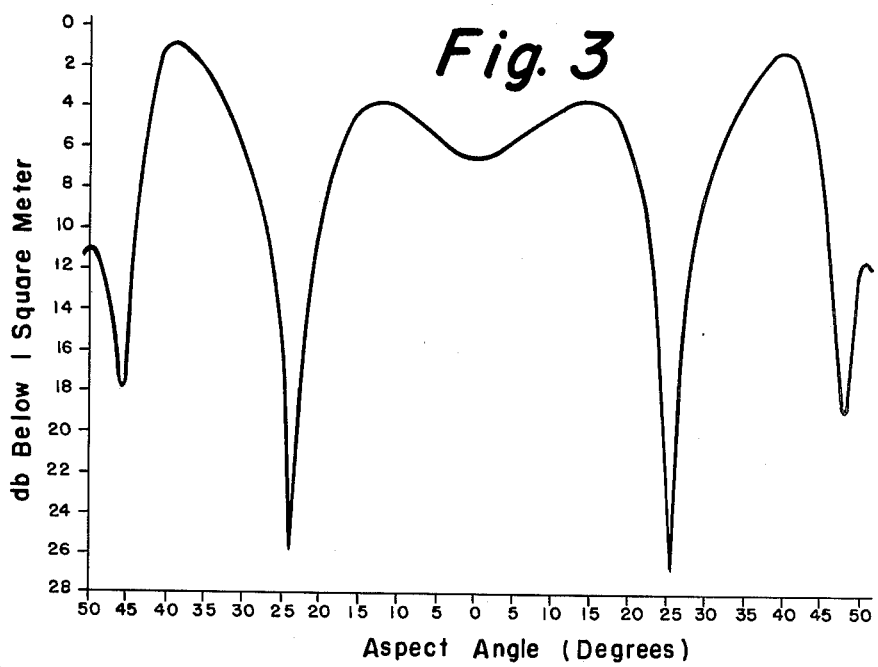
Figure 4:
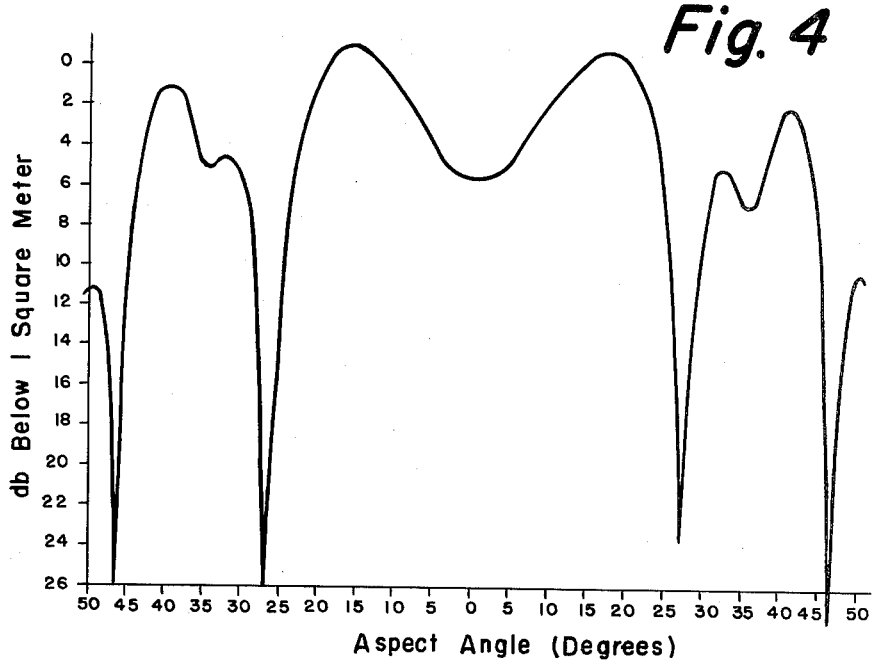
Figure 7:
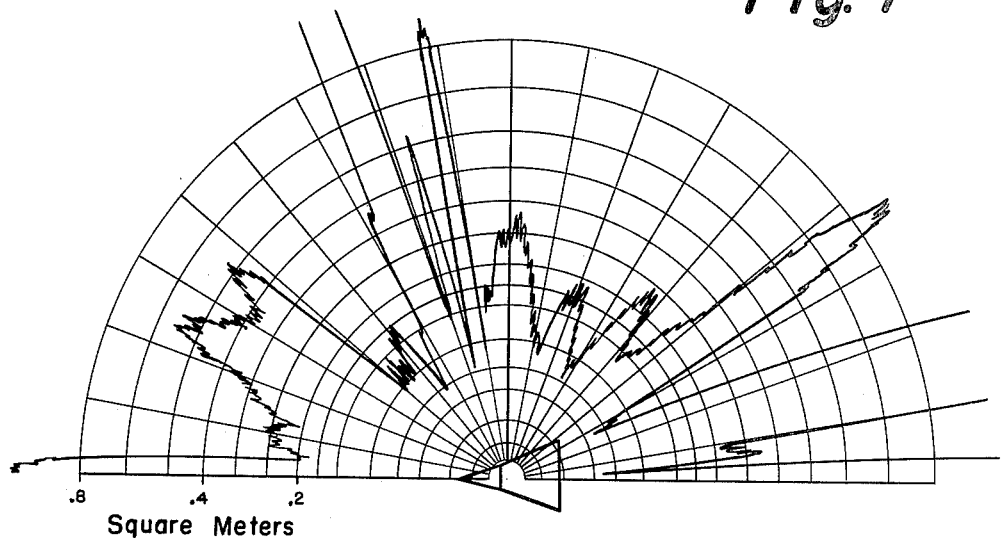
Figure 8:
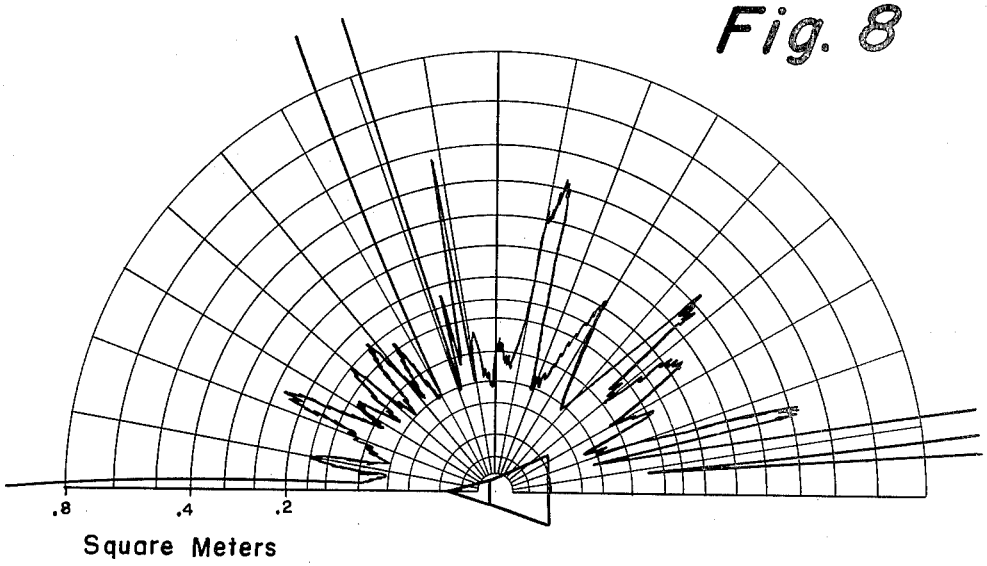

FIGS. 3 and 4 represent the radar reflectivity of the body represented in FIGURE 1 as a function of the aspect angle, or angle with respect to the axis of symmetry of the body, at a frequency of about 1000 megacycles per second, or a wavelength in air of about 11.8 inches; FIGURE 3 represents results obtained with vertical polarization, and FIGURE 4 represents results obtained with horizontal polarization;

FIGS. 5 and 6 represent the radar reflectivity as a function of aspect angle of the body represented in FIGURE 1, FIGURE 5 pertaining to vertical polarization, and FIGURE 6 to horizontal polarization, at a frequency of about 5000 megacycles per seconrd, or a wavelength in air of about 2.36 inches; and FIGS. 7 and 8 represent the radar reflectivity as a function of aspect angle of the body represented in FIGURE 2, FIGURE 7 pertaining to vertical polarization and FIGURE 8 pertaining to horizontal polarization, at a frequency of about 5000 megacycles per second, or a wavelength in air of about 2.36 inches.

FIGURE 1 represents a simple approximately conical body, whose point is rounded, symmetrical around a central axis along which it extends. The surfaces of the point or nose 12, and of the successive frustums 14, 16, 18, 20, 22, 24, 26, 28, and 30 are rings of conductive material; and the successive frustums lying alternately with these, numbered 32, 34, 36, 38, 40, 42, 44, 46, 48 and 50, have non-conductive surfaces which may be described as rings. This structure may be formed in a number of ways, depending upon the intended use of the reflector. For example, if only ordinary temperatures are to be encountered in use, and extreme mechanical stress and abrasion are not to be sustained, the cone may be formed of some suitable plastic (such as polyethylene) by machining from a solid rod or by molding, and the conductive surfaces of the nose 12 and even-numbered frustums 14 through 30, inclusive, may be provided by the application of an electrically conductive coating such as the metallic paints or lacquers used to form so-called printed circuits. For high-temperature operation, the conductive sections may be of graphite and the non-conductive sections may be formed of a ceramic, such as slip-cast silica or steatite, which may be cast in a mold so as to invest the conductive sections, the whole being then fired according to usual ceramic practice.

In the design represented by FIGURE 1, the overall length of an actual embodiment was 50 inches, the nose 12 was made with a 1-inch radius, and the maximum diameter of the frustum 50 was 9.5 inches. The length along the axis of each of the frustums both conductive and non-conductive, evenly numbered 14 through 48, inclusive, was 2.5 inches; and the length of the terminal frustum 50 was 1 inch.

FIGURE 2 represents a reflector adapted to projection through the air with fair stability in flight, having a generally conical shape, but with an increase in cone angle toward the rear. Mechanical details are given rather completely, also. This representation is therefore a partial section through the central axis of symmetry of a body having general circular symmetry. A conical nose 52, having a rounded end, as represented, of conductive material was provided with a conical cavity terminating in a female thread, into which a metal insert 54 was screwed. Insert 54 was tapped to receive a bolt 56 which, being screwed into the tapped hole in insert 54 served to retain rear conical shield 58, electrical insulation 60 being inserted between the shield 58 and the bolt 56 to keep them from electrical contact. A rim or flange at the large, rearward, end of the shield 58 bore upon conductive ring 62, which was thus pressed forward to cause successively smaller diameter conductive rings 64, 68, 70, and 72 to remain in firm mechanical relation to each other, but insulated from each other and from nose 52 by interposed rings of insulating material 74, 76, 78, 80, and 82. Thus a simply assembled and rigid structure, of good aerodynamic characteristics, and providing an array of electrically separated reflectors, was produced. The insulating rings might have been, but were not, made of ferromagnetic dielectric.

For the particular purposes of this design, the ability to withstand high temperatures was desirable, and therefore the nose 52 and the conductive rings or frustums evenly numbered 62 through 72, inclusive, were made of commercial graphite. For similar reasons, insulating rings evenly numbered 74 through 82, inclusive, were made of ceramic insulation. The insert 54 was desired to be heavy, for aerodynamic reasons, and was of a particularly dense material sold commercially as "Hevi-Met," an alloy of 90 percent tungsten, 6 percent nickel, and 4 percent copper. The bolt 56 and the shield 58 were of metal adapted to withstand high temperatures. It will be observed that both the conductive rings and the insulating rings were provided with various internal shoulders of conventional design to retain them readily in alignment.

The dimensions actually employed were as follows: Nose 52 had a tip radius of 0.6 inch, had a cone half-angle of twelve degrees, and was 4.3 inches in diameter at the point of its contact with insulating ring 74. The greatest diameter of ring or frustum 62 was 14 inches. The half-angle of the cone formed by the rear section of the reflector was 22 degrees, greater than that of nose 52 and thus producing the represented spread or increase in flare toward the rear.

It is apparent that the embodiment of FIGURE 2 is suitable for many purposes, including, for example, training in detecting the fall of air-dropped bombs by radar. The embodiment of FIGURE 1 is also stable, is adequately streamlined for application to some other body whose radar reflectivity it is desired to increase, and may be made mechanically strong for various applications. It might readily be mounted as an extension at the end of a spar or mast in a sailboat. All these embodiments demonstrate the basic principle of increasing the reflectivity of a body whose shape, if it were all conductive or all insulating, would cause its radar cross-section to be very small except at a few particular aspect angles. It will be observed that the thickness, that is, the dimension parallel to the axis, of the conductive rings in FIGURE 2 varies from ring to ring, ring 70, for example being larger in that dimension that ring 68, while ring 64 is intermediate between them in thickness. Such a variation in the dimensions of the rings is desirable, although not essential, to make the reflectivity characteristics good over a large band of frequencies. What is being sought is variety, so to speak, to provide a number of separate reflectors of random spacing and resonant frequency to make the reflectors less coherent than those which are produced by a single conductive surface such as an ordinary metal shell, which functions as a single reflector.

FIGURES 3 and 4 represent the radar reflectivity, at a frequency of about 1000 megacycles, of the body represented in FIGURE 1, for vertical and horizontal polarization, respectively. The horizontal scale is the aspect angle in degrees, zero degrees corresponding to the nose-on or head-on aspect. The vertical scale is in decibels below one square meter, or 10,764 square feet. It will be observed that the minima appear over only a few, very narrow, angular ranges, and the cross section is between one-half and one square meter over most of the range from zero to forty-five degrees.

FIGURES 5 and 6 represent the radar reflectivity, at a frequency of about 5000 megacycles, of the body represented in FIGURE 1, for vertical and horizontal polarization, respectively. The scales of ordinates have the same significance as those in FIGURES 3 and 4. The minima are more numerous than in FIGURES 3 and 4, as would be expected for shorter wavelength, but they are all very narrow; and the average value of cross section is perhaps (for it is difficult to do more than estimate an average) ten decibels below one square meter, or 10.764 square feet.

Reference is invited to "Radar System Engineering" edited by Louis H. Ridenour, volume 1 of the Radiation Laboratory series, published in 1947 by the McGraw-Hill Book Company of New York city, N.Y., Chapter 3 on "Properties of Radar Targets," and more particularly to FIGS. 3.8 and 3.9 therein appearing on pages 76 and 77. These figures show that numerous deep minima appear in the reflection patterns of large aircraft which it is well known can readily be detected by radar. In actual practice, the random alternations in the aspect angle between the radar reflector and the observing radar equipment cause the reflectivity to vary, with the deep minima occurring only occasionally; the overall average is well above the minima. To confirm this point, attention is invited to the last paragraph on page 77 of the reference.

FIGURES 7 and 8 represent in polar coordinates the radar cross-section of the embodiment of FIGURE 2, as measured at a frequency of about 5000 megacycles, or a wavelength of about 6 centimeters, 2.36 inches, as a function of the aspect angle of the reflector. The curves are inked copies of curves actually automatically traced by a polar plotting device; the radial distance from the origin indicates the cross section according to the scale marks on the figure. Since at several aspect angles, the radar cross section was beyond the scale of the measuring instrument, the curves show occasional breaks where the cross section was over about one square meter, or 10.764 square feet. Considering that the projected area of the reflector, viewed from the nose, was approximately a square foot, it may be observed that, despite some low points at particular angles, the embodiment demonstrates high cross section at many angles over the entire half-circle from nose-on to dead aft. FIGURE 7 represents the results of using vertical, and FIGURE 8 the results of using horizontal polarization. It will be seen that the results are equally satisfactory with either.

What is claimed is:

1. A reflector of electromagnetic radiation consisting of a succession of rings alternately of conductive and of insulating material arranged along a common axis, and internal means for holding the same firmly fixed with respect to each other.

2. A reflector of electromagnetic radiation consisting of a succession of pieces of circular symmetry, alternately electrically conductive and insulating, arranged along a common axis, and internal means for holding the same fixed with respect to each other.

References Cited by the Examiner

UNITED STATES PATENTS 2,178,237  10/1939  Linder _____ 343—18 X
3,057,579  10/1962  Culter et al.

(Other references on following page)

References Cited by the Applicant

The Experimental Determination of the Far-Field Scattering From Simple Shapes, by J. C. Keys and R. I. Primich, of the Defense Research Telecommunications Establishment, Communications Laboratory (Paper presented at symposium on Electromagnetic Theory, Toronto, June 15, 1959).

A Theoretical Method for the Calculation of the Radar Cross Section of Aircraft and Missiles, by J. W. Crispin, Jr., R. F. Goodrich and K. M. Siegel, of the University of Michigan, College of Engineering, Radiation Laboratory.

The Back-Scattering from a Circular Loop, by Robert G. Kouyoumjian, of the Antenna Laboratory, Ohio State Univ., Columbus, Ohio. (Paper published in Appl. Sci. Res., Sec. B, Vol. 6.)

CHESTER L. JUSTUS, *Primary Examiner.*

C. ROBERTS, P. M. HINDERSTEIN,
*Assistant Examiner*